United States Patent

[11] 3,572,859

[72] Inventor Hans Sommer
 Obourg-lez-mons, Belgium
[21] Appl. No. 848,318
[22] Filed Aug. 7, 1969
[45] Patented Mar. 30, 1971
[73] Assignee Cementfabrik Holderbank-Wildegg AG
 Holderbank, Switzerland
[32] Priority Aug. 28, 1968
[33] Switzerland
[31] 12568/68

[54] ROTATING DRUM WITH RACE RINGS
 6 Claims, 4 Drawing Figs.
[52] U.S. Cl. ............................................. 308/203
[51] Int. Cl. ..................................... F16c 19/00
[50] Field of Search ..................................... 308/202,
 203, 204

[56] References Cited
 FOREIGN PATENTS
 611,813  1/1961  Canada ..................... 308/203

*Primary Examiner*—Fred C. Mattern, Jr.
*Assistant Examiner*—Frank Susko
*Attorney*—Dodge & Ostmann ABSTRACT: A rotating drum with race rings radially supported by bearing rollers and axially supported by supporting rollers, the latter bearing the axial thrusts to which the race rings are subjected due to inclination of the drum and/or mechanical means acting on the drum in axial direction. In the axial region of each race ring an axial portion of the drum has an external conical surface tapering in the direction of the associated supporting roller, and each race ring comprises a corresponding internal conical surface. In operating such a drum with an inclined axis, the majority of the race rings abutting with their downwardly facing end faces on supporting rollers and at least one race ring abutting with its upwardly facing end face on its associated supporting roller, said supporting roller situated at the supper side of its associated race ring being pressed against the latter only at the time of starting and/or in cold state of the drum.

PATENTED MAR 30 1971 3,572,859

ROTATING DRUM WITH RACE RINGS

BACKGROUND OF THE INVENTION

In the case of rotary drums such as kilns, coolers, driers, mixers and the like, various embodiments are known which are intended to guarantee that the race rings are secured to the drum shell so as to be fast in rotation therewith and in play-free manner. The outer surfaces of the drum shell in the region of the race rings and also the inner surface of the latter are given a cylindrical shape, and the race rings are either riveted to the drum shell or axially secured by lateral guide strips and connected to the drum shell by spacer plates inserted gradually between drum shell and race ring.

In such constructions, the race ring must be given a certain amount of play relatively to the drum shell in the cold state, in order that the shell does not become too greatly deformed in the heated state, or owing to upsetting of the hot drum shell inwardly play can occur subsequently in the cold state. But it is necessary to make the race rings sit flush on the drum shell, since otherwise when starting the rotary drum, more especially in the case of large rotary cement kilns, a relative movement will occur in the peripheral direction between the rotary drum and the race rings, which results in wear externally of the drum shell and internally of the race rings. With repeated stressing of this kind, therefore, the race rings no longer embrace the rotary drum tightly in the heated state either. The results are ovality of the drum shell and poor durability of the lining in the case of rotary kilns, which occurs all the more with increasing diameter of the rotary drum and thus increasing race ring dimensions. In the event of local overheating, flush fitting of the race rings on the drum shell is also of great importance since a flush-fitting race ring effects a good dissipation of heat and therefore protects the drum shell in the axial region of the race ring from excessive deformation caused by thermal stresses.

SUMMARY OF THE INVENTION

The invention has as its object to overcome these disadvantages and to provide a reliable connection between the rotary drum and its race rings. For this purpose a rotary drum with race rings of the type, in which each race ring is subjected to an axial thrust in one direction by the drum, is so constructed according to the invention that the rotary drum in the axial region of each race ring comprises a portion whose external conical surface narrows in the direction towards the associated supporting roller, and each race ring comprises a corresponding internal conical surface, the axial thrusts of the supporting rollers and the rotary drum pressing the race rings on to the said portions.

BRIEF DESCRIPTION OF THE DRAWING

Embodiment examples of arrangements according to the invention are represented in simplified form in the drawing, in which.

Figure 1:
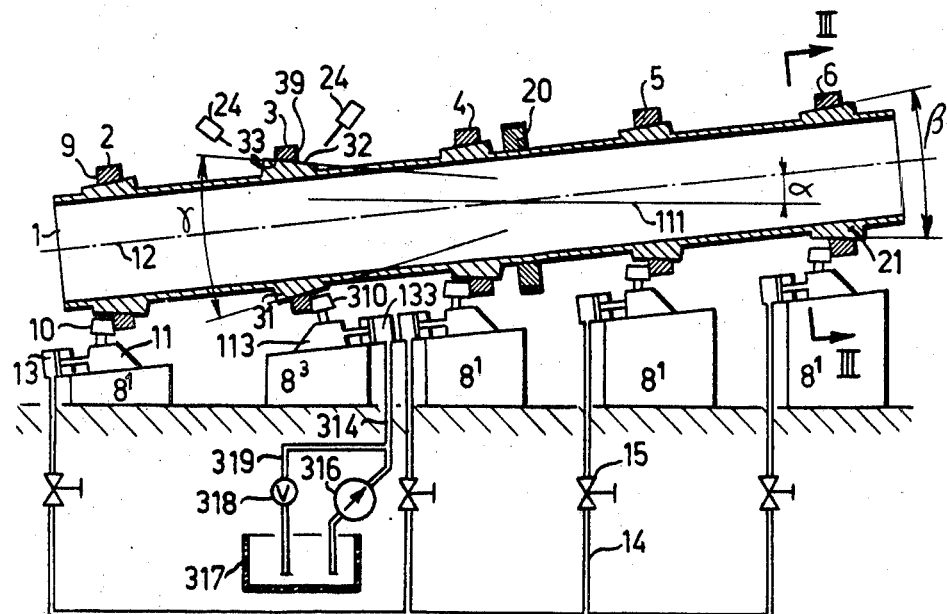
FIG. 1 shows an axial longitudinal section through an inclined rotary drum of a rotary cement kiln.
Figure 2:
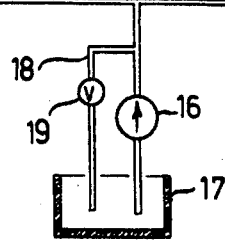
FIG. 2 shows a fragmentary view on a larger scale of the rotary drum according to FIG. 1.

In the drawing, the rotary drums are shown shortened in the axial direction for the sake of better visibility, and the race rings are shown on an enlarged scale axially and radially.

DESCRIPTION OF THE PREFERRED EMBODIMENTS

Figure 3:
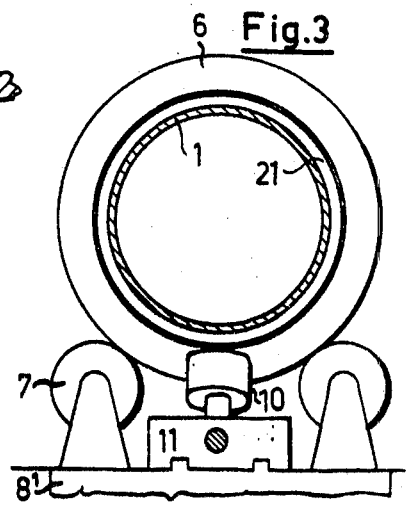
FIG. 3 shows a sectional view taken on the line III—III of FIG. 1.

The rotary cement kiln shown in FIG. 1 comprises an inclined rotary drum 1 with race rings 2 to 6 which are supported by bearing rollers 7 mounted on a foundation system 8 or foundation elements $8^1$ and $8^3$. In FIG. 1 the supporting rollers 7 are not illustrated; FIG. 3 shows the arrangement of the bearing rollers 7 of the race ring 6. The race rings 2, 4, 5, 6 are subjected by the rotary drum to an axial thrust in the downward direction which is due to the inclination of the rotary drum. The race rings 2, 4, 5, 6 abut with their end faces 9 directed downwards on supporting rollers 10 which are mounted on the foundation system 8 or in the foundation elements $8^1$, and subject the race rings to an axial thrust in the opposite direction i.e., upwardly. It is also possible to provide a plurality of supporting rollers for each race ring. The aforesaid supporting rollers are mounted in supports 11 which are mounted to be movable parallel to the axis 12 of the rotary drum 1 in the foundation elements $8^1$ relatively to one another and the foundation system 8 or foundation elements $8^1$, and are supported by means of a pressure system which comprises four servomotors 13, pressure conduits 14 with valves 15, a pump 16, a container 17 and a bypass valve 19 which is interposed in a bypass conduit 18. The supporting rollers 10 bear the axial thrusts which act on the race rings 2, 4, 5, 6 from the rotary drum 1 owing to the inclination of the said drum. Modifications in the spacing between the race rings 2, 4, 5, 6 for example owing to thermal stress and displacement of the rotary drum as a whole do not result in any modification of the conditions of the axial forces at the individual race rings 2, 4, 5, 6, since a pressure increase in one servomotor 13 acts on the other servomotors. 20 designates a toothed annulus which is used for driving the rotary drum through the agency of a pinion (not shown) by means of a motor (also not shown).

According to the invention, the rotary drum comprises in the axial region of each race ring 2, 4, 5, 6 a portion 21 having an external conical surface 22 tapering in the direction towards the associated supporting roller 10, and each of the race rings 2, 4, 5, 6 comprises a corresponding internal conical surface 23, that is to say a conical surface narrowing in the direction towards the associated supporting roller 10. The axial thrusts of the supporting rollers 10 in the direction upwards and the axial thrusts of the rotary drum which act on the race rings 2, 4, 5, 6 owing to the inclination of the said drum, press the race rings 2, 4, 5, 6 on to the portions 21.

The measures according to the invention guarantee that the race rings are always connected in play-free manner to the rotary drum so as to be fast in rotation therewith, more particularly including when in the cooled state i.e., including at the time of starting. In this way, relative movements in the peripheral direction between the rotary drum and the race ring and also local overheating in the region of the race rings are reliably obviated.

In practice, the inclination of the axis 12 of the rotary drum 1 relatively to the horizontal 111 in rotary cement kiln amounts to between 2° and 6°; in the illustrated example the angle of inclination $\alpha$ amounts to 6°. The opening angle $\beta$ of the external conical surfaces 22 of the portions 21 and the internal conical surfaces 23 of the race rings 2, 4, 5, 6 in the illustrated example of embodiment amounts to 12°, and thus twice the angle of inclination of the axis of the rotary drum relatively to the horizontal. The angle of conicity of these conical surfaces advantageously never amounts to more than twice the angle of inclination of the axis of the rotary drum relatively to the horizontal, the undermost generatrix of the two aforesaid conical surfaces being always inclined relatively to the horizontal in the sense of the axis of the rotary drum and in the extreme case extends parallel to the horizontal. Keeping within these limits avoids any tendency of the rotary drum to migrate in the direction upwards out of the race rings.

The inclination of the rotary drum axis can only be fixed within specific limits which are dependent for example on the length of the drum, the throughput quantity, the material, and the process being carried out in the drum. Therefore, it may happen that the axial thrust acting downwardly on the race rings from the rotary drum is not sufficient, together with the axial thrust acting from the supporting rollers on the race rings in the opposite direction, namely in the upward direction, which must always be less than the downward thrust, to reliably press the race rings against the drum portions under all operating conditions. With an extremely small inclination of the drum, it is also not possible to avoid the lowest generatrices of the conical surfaces of the shell portions and race rings, which surfaces are narrowed towards the associated running roller, that is to say in the downward direction, from being inclined oppositely to the axis of the rotary drum relatively to the horizontal, since it is not possible to manage without a minimum inclination in order to avoid excessive axial displacement of the race rings.

To overcome these difficulties, in the rotary drum shown in FIG. 1 the conical surfaces 32 and 33 of the drum portion 31 associated with the race ring 3 and of the race ring 3 are shaped to narrow upwards i.e., in the direction opposite to the direction of thrust effected by the inclination of the axis of the rotary drum, and the race ring 3 bears with its upwardly facing end face 39 against a supporting roller 310. The supporting roller 310 is supported in a support 113 so as to be displaceable parallel to the axis 12 of the rotary drum 1 relatively to the foundation element 8³ or the foundation system 8, through the agency of a pressure system comprising a servomotor 133, a pressure conduit 314, a pump 316, a container 317 and a bypass conduit 318 with interposed bypass valve 319. By means of the pressure system 133 to 139 and the supporting roller 310 through the agency of the race ring 3 the rotary drum 1 can have imparted to it the axial thrust in the downward direction which is necessary to press all the race rings with sufficient force on to the drum portions associated with them.

If it is necessary to increase the downwardly acting axial thrust, the pressure of the pressure medium on the surface of the piston of the servomotor 133 can be increased. However, it is also possible to provide at more than one race ring a supporting roller acting downwardly on it and arranged on the upper side of it.

In the illustrated example of embodiment, the race ring 3 is situated in a zone of elevated temperature. Since considerable expansion of the race ring must be expected here, the conical surfaces 32, 33 of the portion 31 or the race ring 3 have an opening angle $\gamma$ which is twice as great as the opening angle $\beta$ of the conical surfaces 22, 23 of the remaining portions 21 or race rings 2, 4, 5, 6. This measure obviates the race ring 3, under the action of the supporting roller 310, in the event of a given amount of thermal expansion being displaced excessively and possibly outside the axial range of its bearing rollers.

The feature of the relatively large opening angle of the conical surfaces of the drum portion and race ring is also generally suitable where a race ring has to transmit a particularly great axial thrust from a supporting roller to a rotary drum.

When operating the installation according to FIG. 1, on starting in the cold state, where the secure flush seating of the race rings on the relevant drum portions is particularly necessary, but is least readily forthcoming, by means of the supporting roller 310 a particularly great axial thrust is exerted in the direction downwardly on to the race ring 3 and thus on to the rotary drum 1. As soon as the rotary drum has heated sufficiently, the force with which the supporting roller 310 is pressed on the race ring 3 can be reduced; in some cases, more particularly with adequate inclination of the rotary drum, it is sufficient if the supporting roller 310 is presses against the race ring 3 only at the time of starting and/or in the cold state of the rotary drum.

The temperature of those zones of the rotary drum which are situated directly below the race rings cannot be visually supervised owing to the close fit thereof on the drum portions. In order to enable considerable overheating of the rotary drum shell to be discovered in good time especially in hot zones of the rotary drum, radiation pyrometers 24 are provided which trigger an optical or acoustic signal as soon as a critical temperature is reached.

Figure 4:
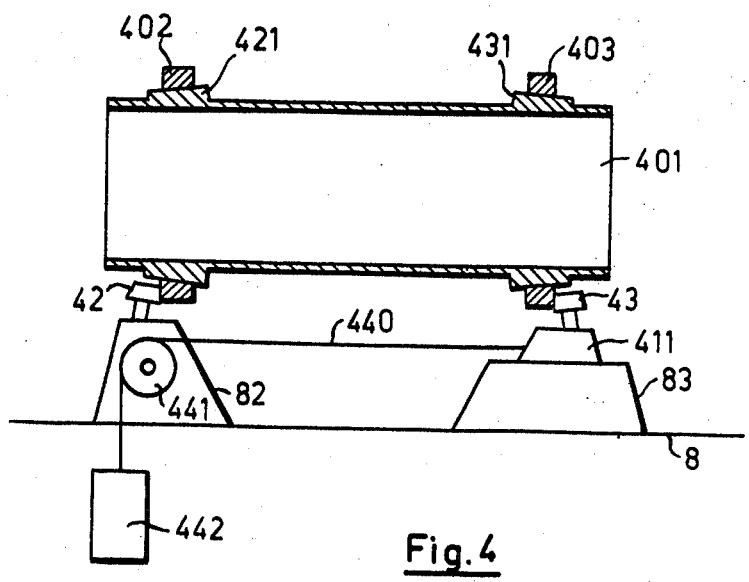
FIG. 4 shows an axial longitudinal section of a horizontal rotary drum.

The use of the underlying idea of the invention is not limited to the inclined rotary drum shown in FIG. 1, and is possible with any rotary drum having at least two race rings. A very simple example is shown in FIG. 4 which illustrates a horizontal rotary drum 401 with two race rings 402 and 403. The bearing rollers (7 in FIG. 3) are not shown. The foundation system 8 comprises a foundation element 82 and 83 respectively each associated with a race ring. The supporting roller 42 associated with the race ring 402 is securely mounted in the foundation element 82 with its pivot pin. The supporting roller 43 associated with the race ring 403 is mounted in a support 411 which is displaceable parallel to the axis of the rotary drum. The conical surfaces of the drum portions 421, 431 and of the race rings 402, 403 are shaped to taper towards the associated supporting roller. A rope 440 leads from the support 411 over a pulley 441 to a weight 442. By this weight, the support 411 with the supporting roller 43 is moved in the direction towards the widening of the conical surfaces of the race ring 403 and portion 431 associated with this supporting roller.

The race ring 402 is subjected by the rotary drum 401 to an axial thrust in the direction towards the left of the illustration, and abuts with its end face facing towards the left in this direction against the supporting roller 42. The race ring 403 is subjected by the rotary drum 401 to an axial thrust in the direction towards the right in the illustration, and abuts with its end face facing towards the right in this direction on the supporting roller 43. The supporting rollers 42 and 43 are pressed on to the race rings with the force appropriate to the axial force which is to be accepted, and to the axial thrusts of the supporting rollers 42, 43 and the rotary drum 401 press the race rings on to the relevant drum portions.

I claim:

1. A rotary drum (1 or 401), having at least two race rings (2, 3, 4, 5, 6 or 402, 403), each of which is supported radially by a pair of spaced apart bearing rollers (7); means (20) for driving said drum; each of said race rings being subjected by said drum to an axial thrust in one direction; on the side of each of said race rings facing in the said respective direction at least one supporting roller (10, 310 or 42, 43) mounted so as to be movable parallel to the drum axis (12) relatively to one another, said race rings abutting on said supporting rollers; means (13, 133 or 442) for pressing said supporting rollers against said race rings so as to bear said axial thrusts; in which rotary drum in the region of each race ring an axial portion (21, 31 or 421, 423) is provided, which has an external conical surface (22, 32) tapering in the direction towards its associated supporting roller (10, 310 or 42, 43), and in which each race ring comprises a corresponding internal conical surface (23, 33), said axial thrusts of said supporting rollers and of the rotary drum pressing said race rings on to said conical drum portions.

2. The arrangement defined in claim 1, in which the axis (12) of the drum (1) is inclined respectively to the horizontal (111), the drum thus being subjected to a downwardly acting axial thrust; some of the race rings (2, 4, 5, 6) abutting with their downwardly facing end faces (9) on their associated supporting rollers (10) and the remaining race rings (3) abutting with their upwardly facing faces (39) on their associated supporting rollers (310).

3. The arrangement defined in claim 1, in which in the drum (1) different temperatures prevail along the drum axis (12); at least one axial portion (31) of the drum situated in an axial zone of relatively high temperature and its associated race ring (3) having conical surfaces (32, 33) with a greater opening angle ($\gamma$)than, preferably approximately twice as great as, the opening angle ($\beta$) of the conical surfaces (22, 23) of the remaining axial portions (21) of the drum and race rings (2, 4, 5, 6). 4, 5, 6), 4. The arrangement defined in claim 2, in which at least the majority of the race rings (2, 4, 5, 6) abutting with their downwardly downwardly directed faces (9) on supporting rollers (10) and the associated axial portions (21) of the drum (1) have internal and external conical surfaces (23, 22) respectively, whose opening angle ($\beta$) is at the most twice as great as the angle ($\alpha$) of the axis (12) of the drum relatively to the horizontal (111).

5. The arrangement defined in claim 2, in which in the drum (1) different temperatures prevail along the drum axis, and at least one axial portion (31) of the drum situated in an axial zone of relatively high temperature and its associated race ring (3) have conical surfaces (32, 33) with a greater opening angle ($\gamma$) than the opening angle ($\beta$) of the conical surfaces (22, 23) of the remaining axial portions (21) of the drum and race rings (2, 4, 5, 6), and in which arrangement the race ring (3) associated to said axial zone of relatively high temperature, which race ring and its associated axial portion (31) of the drum have conical surfaces (32, 33) with greater opening angles ($\gamma$) than the other race rings (2, 4, 5, 6) and axial portions (21) of the drum, abuts with its upwardly facing end face (39) on its associated supporting roller (310).

6. The arrangement defined in claim 5 and means to adjust the force exerted by the means pressing the roller situated at the upper side of its associated race ring against that race ring whereby the force exerted may be reduced in the steady operating state of the drum.